(12) United States Patent
Novick et al.

(10) Patent No.: US 9,665,891 B2
(45) Date of Patent: May 30, 2017

(54) PRICE DIFFERENTIATION BY MARKET FOR IN-APP SOFTWARE PURCHASES

(71) Applicant: Microsoft Technology Licensing, LLC, Redmond, WA (US)

(72) Inventors: Steven Novick, Seattle, WA (US); Daniel Lau, Bellevue, WA (US); Avijit Sinha, Newcastle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 650 days.

(21) Appl. No.: 13/749,474

(22) Filed: Jan. 24, 2013

(65) Prior Publication Data
US 2014/0207623 A1    Jul. 24, 2014

(51) Int. Cl.
| | |
|---|---|
| G06Q 30/00 | (2012.01) |
| G06Q 30/02 | (2012.01) |
| G06Q 30/06 | (2012.01) |
| H04W 4/00 | (2009.01) |
| H04W 4/24 | (2009.01) |
| H04M 15/00 | (2006.01) |

(52) U.S. Cl.
CPC ..... *G06Q 30/0283* (2013.01); *G06Q 30/0635* (2013.01); *H04M 15/43* (2013.01); *H04M 15/80* (2013.01); *H04M 15/8033* (2013.01); *H04W 4/001* (2013.01); *H04W 4/003* (2013.01); *H04W 4/24* (2013.01)

(58) Field of Classification Search
CPC ........ G06Q 30/06–30/08; G06Q 50/01; G06Q 30/0206; G06Q 30/0207; G06Q 30/0269

USPC .................................. 705/26.1–27.2
See application file for complete search history.

(56) References Cited

U.S. PATENT DOCUMENTS

| | | |
|---|---|---|
| 2005/0289047 A1 | 12/2005 | Oliver et al. |
| 2009/0055328 A1 | 2/2009 | Bamford et al. |
| 2010/0235889 A1* | 9/2010 | Chu et al. .......................... 726/4 |
| 2011/0269484 A1 | 11/2011 | Cazanas et al. |

(Continued)

FOREIGN PATENT DOCUMENTS

JP    2012-238203 A    12/2012

OTHER PUBLICATIONS

"International Search Report and Written Opinion Issued in PCT Application No. PCT/US2014/012231", Mailed Date: Oct. 27, 2014, 10 Pages.

(Continued)

*Primary Examiner* — Ethan D Civan
(74) *Attorney, Agent, or Firm* — Steven F. Owens (57) ABSTRACT

Different prices may be charged for an In-App Purchase (IAP) for a same item based on a market associated with the user. For example, a user in one market may be charged a different price for an item than what is charged for the item to a user in a different market. A different product identifier is associated with the item for each of the different markets for the item. The item is submitted to the application store as different items that have the different product identifiers for each of the different markets. When an IAP request for an item is received from a user, a market that is associated with the user is determined based on a location associated with the user. After determining the market for the user, the product identifier that identifies the product is used to obtain the item from the application store.

20 Claims, 8 Drawing Sheets

(56) References Cited

U.S. PATENT DOCUMENTS

2012/0072312 A1 3/2012 Lange et al.
2012/0109771 A1 5/2012 Zargahi
2013/0137405 A1* 5/2013 Kirik et al. ................ 455/414.1

OTHER PUBLICATIONS

European Extended Search Report in 14702416.0, mailed Jul. 14, 2016, 6 pages.
Leblond, Antoine, "Making Money with your Apps through the Windows Store", Published on: Jul. 21, 2012, Available at: http://blogs.msdn.com/b/windowsstore/archive/2012/07/20/making-money-with-your-apps-through-the-windows-store.aspx.
"Choosing your Business Model (Windows)", Retrieved on: Mar. 8, 2013, Available at: http://msdn.microsoft.com/en-gb/library/windows/apps/jj193599.aspx#options_inapp.
Spencer, Graham, "Game In-App Purchases: A Conflict Between Developer Economics & Goodwill", Published on: Jun. 1, 2012, Available at: http://www.macstories.net/stories/game-in-app-purchases-a-conflict-between-developer-economics-goodwill/.
Armstrong, Mark, "Price Discrimination", Published on: Oct. 2006, Available at: http://eprints.ucl.ac.uk/14500/1/14500.pdf.
Pelleri, Daniele, "Apple App Store Pricing—Tier 1 to 21", Published on: Mar. 14, 2012.
Mikians, et al., "Detecting Price and Search Discrimination on the Internet", In Proceedings of the 11th ACM Workshop on Hot Topics in Networks, Oct. 29, 2012, 6 pages.
Troy, "In App Purchases: A Full Walkthrough", Published on: Jan. 17, 2010, Available at: http://troybrant.net/blog/2010/01/in-app-purchases-a-full-walkthrough/.
Leblond, Antoine, "Listing your Desktop App in the Store", Published on: Jun. 8, 2012, Available at: http://blogs.msdn.com/b/windowsstore/archive/2012/06/08/listing-your-desktop-app-in-the-store.aspx.

* cited by examiner

PRICE DIFFERENTIATION BY MARKET FOR IN-APP SOFTWARE PURCHASES

BACKGROUND

The pricing system for paid Apps and In-App Purchases in APPLE CORPORATION's app store uses tiered pricing. Currently, developers pick one of 87 price tiers for their product, ranging from US$0.99-$999.99. Based on the selected tier, Apple determines the relative pricing to adjust for various currencies within that tier. Once a price tier is selected, that price tier is used across different markets.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Different prices may be charged for an In-App Purchase (IAP) for a same item based on a market associated with the user. For example, a user in one market may be charged a different price for an item than what is charged for the item to a user in a different market. A different product identifier is associated with the item for each of the different markets for the item. The item is submitted to the application store as different items that have the different product identifiers for each of the different markets. When an IAP request for an item is received from a user, a market that is associated with the user is determined based on a location associated with the user. A location of the account of the user for the application store may be used as the market identifier. For example, if the user has an account in the United States, then the location to use in determining the market for that user is the United States. After determining the market for the user, the product identifier that identifies the product is used to obtain the item from the application store.

DETAILED DESCRIPTION

Referring now to the drawings, in which like numerals represent like elements, various embodiment will be described.

Figure 1:
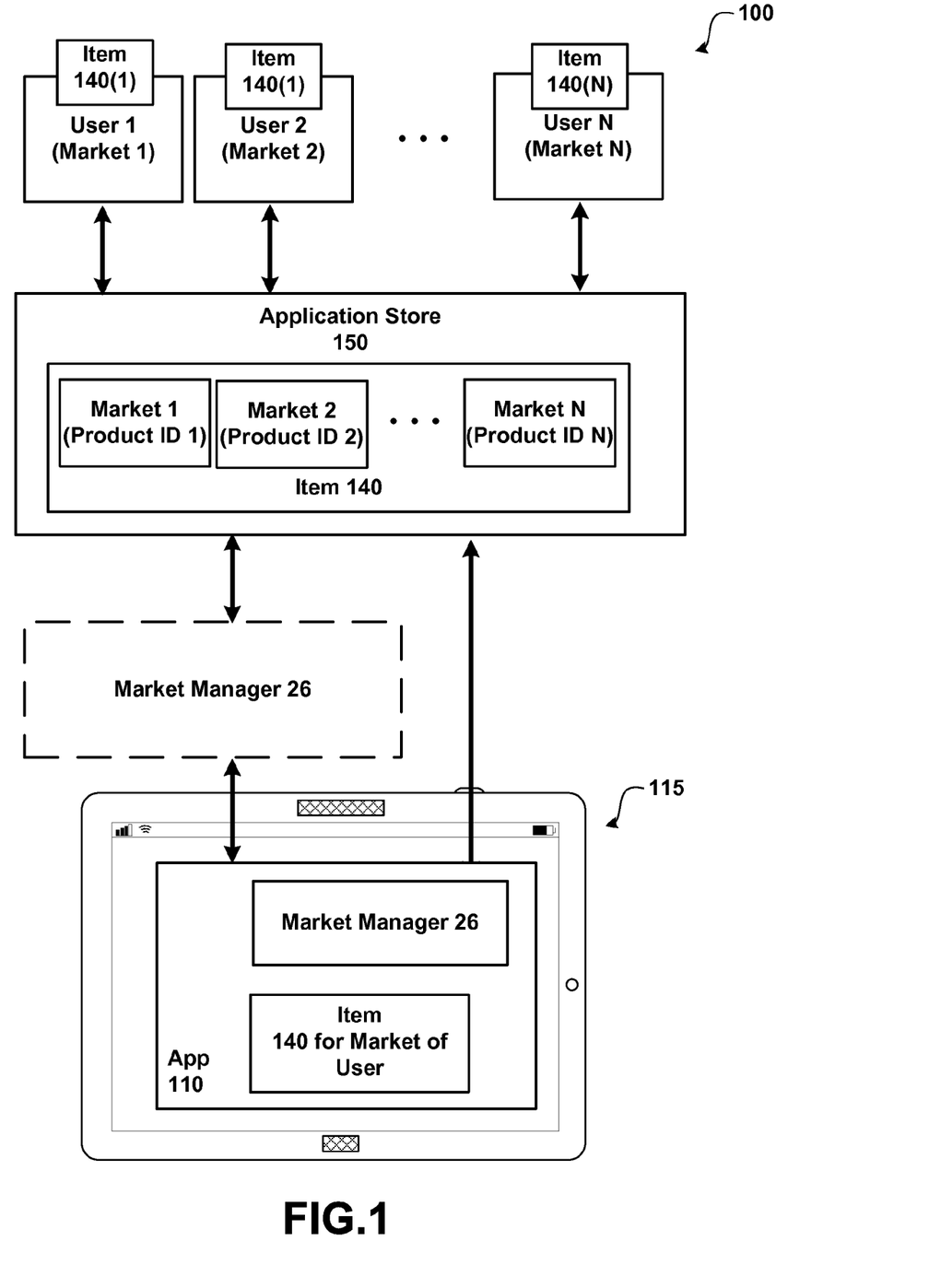
FIG. 1 shows a system for In-App purchase pricing by market.

FIG. 1 shows a system for In-App purchase pricing by market. As illustrated, system 100 includes market manager 26, application store 150 including item 140 having different product IDs (1-N) for different markets (1-N), users 1-N associated with different markets (1-N), app 110 and touch screen input device 115.

In order to facilitate communication with the market manager 26, one or more callback routines, may be implemented. According to one embodiment, app 110 is an application running on a computing device that uses the iOS operating system from APPLE CORPORATION.

App 110 may be stored/run on one or more computing devices. For example, app 110 may be included on a touch-sensitive computing device 115 and/or other devices. Device 115 may be configured to receive/provide different forms of input/output. For example, voice input, keyboard input (e.g. a physical keyboard and/or SIP), video based input, and the like. Device 115 may also provide multimodal output (e.g. speech, graphics, vibrations, sounds, . . . ). Device 115 detects when a touch input has been received (e.g. a finger touching or nearly teaching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micromachined accelerometers, piezoelectric devices, capacitive sensors, resistive sensors, inductive sensors, laser vibrometers, and LED vibrometers. According to an embodiment, a user may use multimodal input to interact with an app on device 115 (e.g. gestures/speech/textual input/ . . . ). Gestures may include, but are not limited to: a pinch gesture; a stretch gesture; a select gesture (e.g. a tap action on a displayed element); a select and hold gesture (e.g. a tap and hold gesture received on a displayed element); a swiping action and/or dragging action; and the like.

Application store 150 is a digital content (e.g. items/apps) and distribution platform. According to an embodiment, application store 150 is the APPLE APP STORE ("the app store"). The app store is a digital application distribution platform for iOS applications and digital content. The app store is developed and maintained by APPLE, INC. Different digital content/items may be accessed through the app store. For example, the digital content may comprise: iOS applications, subscriptions (e.g. to application(s)/service(s), digital magazines/newsletters, digital books/photos, additional levels (e.g. game levels), additional functionality (e.g. application functionality . . . ), access to a service (e.g. a map service, music service, application(s) service, . . . ), and the like. The digital content may be downloaded to a device (e.g. directly to an iOS device and/or downloaded onto a personal computer via ITUNES provided by APPLE, INC.

Currently, there are four supported categories of In-App Purchase items from the app store, comprising: content; functionality; services; and subscriptions. Each product from the supported categories fall within one of the following purchase types: consumables, non-consumables, auto-renewable subscriptions, free subscriptions, an non-renewing subscriptions. Consumables are In-App Purchases that are purchased each time the user needs the product (e.g. supplies in a game (ammunition, health points, cheats, extra lives, . . . ), accelerators used to decrease advancement time within an app, and the like). Non-Consumables are In-App Purchases that are purchased once (e.g. do not expire) by the user and are available to each device registered to a user. Some examples of Non-Consumable purchase types are: additional levels within a game; access to pro-features such as additional camera lenses or audio effects; lifetime subscription to a service; books and individual magazine issues; and the like). Auto-Renewable Subscriptions allow the user to purchase episodic content or access to dynamic digital content for a set duration time that is automatically renewed until the user opts out. Non-Renewing Subscription allows the sale of services with a limited duration that do not automatically renew.

The app store provided by APPLE does not currently provide a way for developers to charge different prices for an item in different markets. Instead, a developer selects a single price tier that is used across each of the different markets. The description herein is directed at associating different prices for an IAP for an item in the app store based on the market that is associated with the user. For example, user 1 may be associated with market 1 (price 1), user 2 may be associated with market 2 (price 2), user N may be associated with market N (price N).

Market manager 26 is directed at selecting a different product in the app store based on a market associated with the user for an item in the app store. For example, a user using app 110 may be charged a different price for an item from the app store than what is charged for the item from a different user using a same application for an IAP in a different market. A different product identifier (Product ID 1-N) is associated with each of the different markets (e.g. MARKETS 1-N) for the item. According to an embodiment, each item that is provided to each of the different users is a same version of the item with the different being the price for the item. For example, if a user in the United States has an IAP request for a subscription to an application, the price for the same subscription may be different from an IAP request from a user whose determined market is China, or some other market. When a developer creates an item to be sold in the app store, the developer associates a different product ID with each of the different markets. Each of these different items having the different product IDs are submitted to the app store as a different product.

For example, assume that a user using app 110 performs an IAP request for item 140 that is stored within the app store. In response to the request for Item 140, app store 150 returns a location that is associated with the user. According to an embodiment, the location information is returned in a priceLocale property, which may be used to help format the price of the product for display. The property is an NSLocale object and contains country information that corresponds to the Mac app or iTunes store country for the Apple ID being used that is used by user to access/purchase items from app store.

The following table lists different Apple IDs from various countries, and the corresponding NSLocale info strings retrieved from an SKProduct object.

| Apple ID country | NSLocaleCountryCode | NSLocaleCurrencyCode |
|---|---|---|
| China | "CN" | "CNY" |
| France | "FR" | "EUR" |
| Italy | "IT" | "EUR" |
| Poland | "PL" | "EUR" |
| United States | "US" | "USD" |

Once the market for the user has been determined, the correct product ID to access the item associated with the user's market is determined. This may be a simple mapping (e.g. country X—Product ID 123X, country Y—Product ID 123Y, . . . ). After determining the market for the user, market manager 26 may display information (e.g. pricing information for the determined market to the user) and obtain/purchase the item from the app store. More details are provided below.

Figure 2:
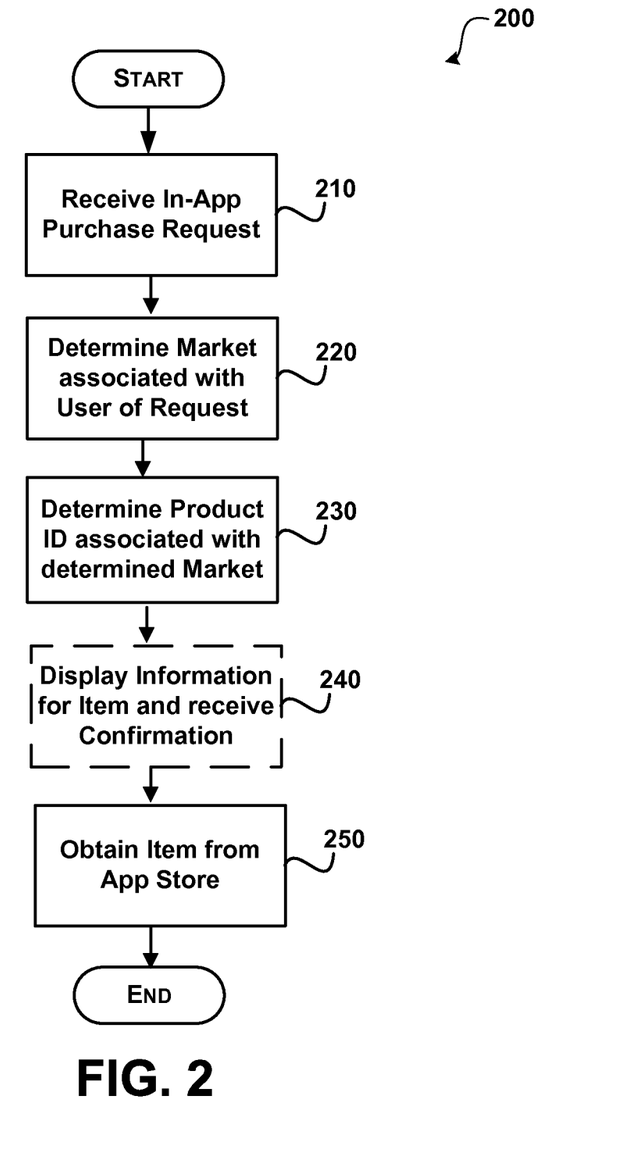
FIG. 2 shows a process for performing an In-App Purchase for an item that is priced according to a market.
Figure 3:
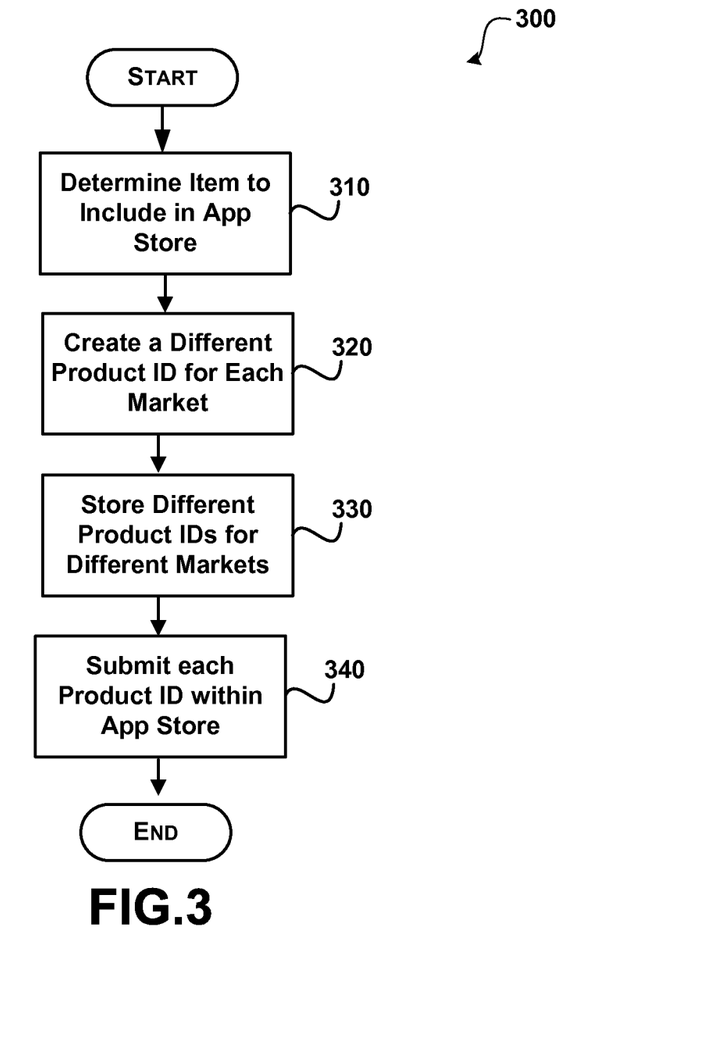
FIG. 3 shows a process for associating product identifiers within an item purchased using an In-App purchase request.

FIGS. 2 and 3 shows illustrative processes (200, 300) for setting different prices for an In-App Purchase. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 2 shows a process 200 for performing an In-App Purchase for an item that is priced according to a market.

After a start operation, the process moves to operation 210, where an In-App Purchase request is received. According to an embodiment, the TAP is a request made from an iOS app for an item from APPLE's app store. Currently, there are four supported categories of In-App Purchase items from the app store, comprising: content; functionality; services; and subscriptions. Each product from the supported categories fall within one of the following purchase types: consumables, non-consumables, auto-renewable subscriptions, free subscriptions, an non-renewing subscriptions.

Flowing to operation 220, the market that is associated with the user of the request is determined. According to an embodiment, the market is identified using location information returned from the app store. For example, in response to the TAP request, the app store 150 returns a property that contains country information that corresponds to the country that is associated with the Apple ID that is currently being used. A market may be defined according to the developer. For example, each country may be a market, a market may be defined by some combination of countries, and the like. According to another embodiment, the market may be determined using additional and/or other location information (e.g. where the devices is registered, identifying information associated with the user, GPS information, and the like).

Moving to operation 230, the product ID of the item that corresponds to the market for the user is determined. According to an embodiment, a mapping between the country, market and corresponding product ID is maintained. For example, the product IDs may be stored within the app from which the user makes the IAP request, in a local data store, a network data store, and the like. Each market is associated with a different product ID.

Transitioning to operation 240, information and/or confirmation associated with the item may be displayed. For example, the product ID may be used to determine the price of the product for the market of the user. A confirmation of the IAP may also be received.

Flowing to operation 250, the item is obtained from the app store. The process then moves to an end operation and returns to processing other actions.

FIG. 3 shows a process 300 for associating product identifiers within an item purchased using an In-App purchase request.

After a start operation, the process moves to operation 310, where an item to include in an app store is determined. As discussed above, the item may be an item that may be purchased using an IAP request. For example, the item may be content; functionality; services; and subscriptions. Each item from the supported categories fall within one of the following purchase types: consumables, non-consumables, auto-renewable subscriptions, free subscriptions, an non-renewing subscriptions.

Flowing to operation 320, a different product ID is created for each different market. For example, assume that the item is to be sold in two different markets. The US and Canada in the first market a price of $0.99 and Mexico and Australia in a second market at a price of 1.99 MXP and 1.99 AUD. A product ID is created for each of the two different markets and they are assigned to different price tiers within iTunes Connect provided by APPLE CORPORATION. Generally, iTunes Connect includes a suite of web-based tools that allows a developer to submit and manage apps for distribution on the App Store and Mac App Store. For this example, these may be specified as:

| ProductID | Price Tier |
|---|---|
| com.Company.Mobile.Subscription1 | Tier 1 |
| com.Company.Mobile.Subscription2 | Tier 2 |

Transitioning to operation 330, the different product IDs are stored. APPLE does not provide users a way to retrieve a list of Product IDs from the App Store. According to an embodiment, the product IDs for each of the different markets is stored within the application and is tracked locally by the app. The product IDs for each of the different markets may also be retrieved from a different data store (e.g. local data store, network data store, server . . . ).

Moving to operation 340, the item with different product IDs for each different market is submitted to the app store. Each product that is offered for purchase within an app is submitted to the software application store (e.g. the app store through iTunes Connect). Generally, when the product is submitted, a name, a description, a single price, a preview image, and other information (e.g. localized versions of the item name and description). Each item submitted to the app store includes a product identifier that is associated with the application and uniquely identifies an item sold. The application uses this product id to fetch localized item descriptions and pricing information from the app store and to request payments.

The process then moves to an end operation and returns to processing other actions.

Figure 4:
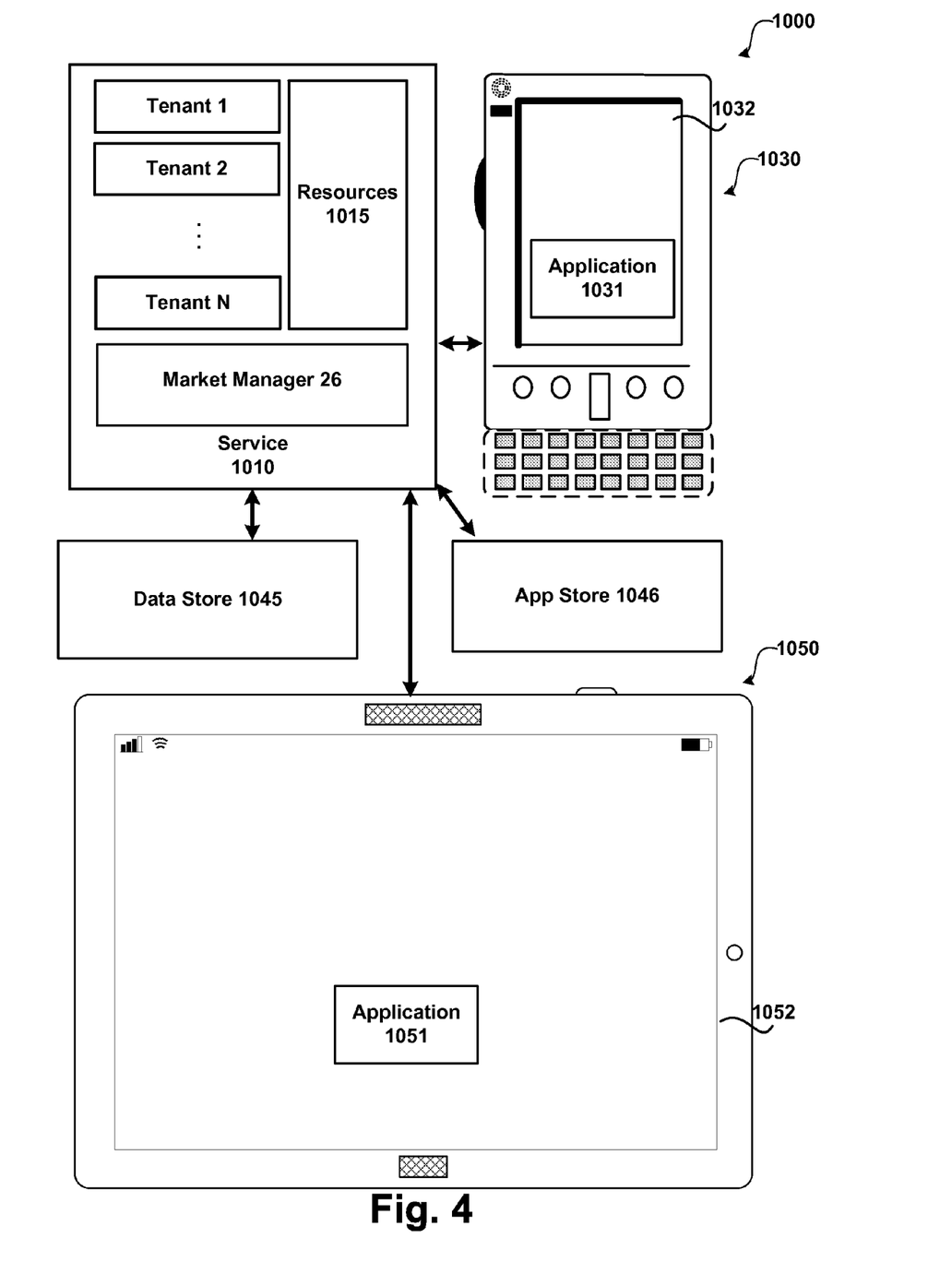
FIG. 4 illustrates an exemplary system using In-App Purchases that are priced according to a market for a user.

FIG. 4 illustrates an exemplary system using In-App Purchases that are priced according to a market for a user. As illustrated, system 1000 includes service 1010, data store 1045, touch screen input device/display 1050 (e.g. a slate) and smart phone 1030.

As illustrated, service 1010 is a cloud based and/or enterprise based service that may be configured to provide services, such as multimodal services related to various applications (e.g. games, browsing, locating, productivity services (e.g. spreadsheets, documents, presentations, charts, messages, and the like)). The service may be interacted with using different types of input/output. For example, a user may use speech input, touch input, hardware based input, and the like. The service may provide speech output that combines pre-recorded speech and synthesized speech. Functionality of one or more of the services/applications provided by service 1010 may also be configured as a client/server based application.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device/display 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030 and touch screen input device/display 1050 are configured with apps (1031, 1051) obtained from the app store of APPLE and run iOS.

As illustrated, touch screen input device/display 1050 and smart phone 1030 shows exemplary displays 1052/1032 showing the use of an app that may make an IAP from the app store 1046. Data may be stored on a device (e.g. smart phone 1030, slate 1050 and/or at some other location (e.g. network data store 1045). Data store 1045 may be used to store the product IDs for the different markets as discussed herein. The applications used by the devices may be client based applications, server based applications, cloud based applications and/or some combination.

Market manager 26 is configured to perform operations relating to determining a market for a user when an IAP request is received as described herein. While manager 26 is shown within service 1010, the functionality of the manager may be included in other locations (e.g. on smart phone 1030 and/or slate device 1050).

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
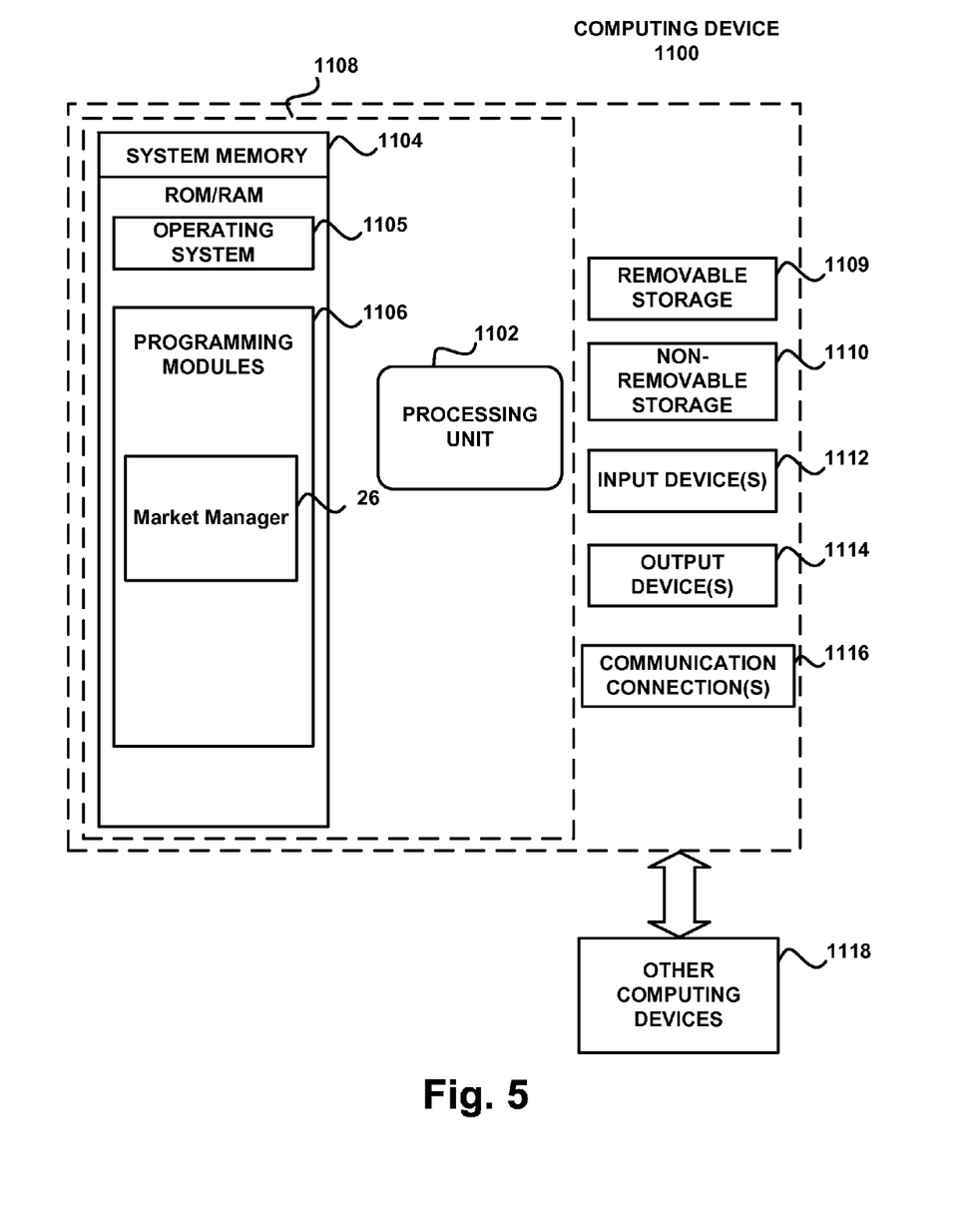
FIGS. 5-7 and the associated descriptions provide a discussion of a variety of operating environments in which embodiments of the invention may be practiced.
Figure 6A:
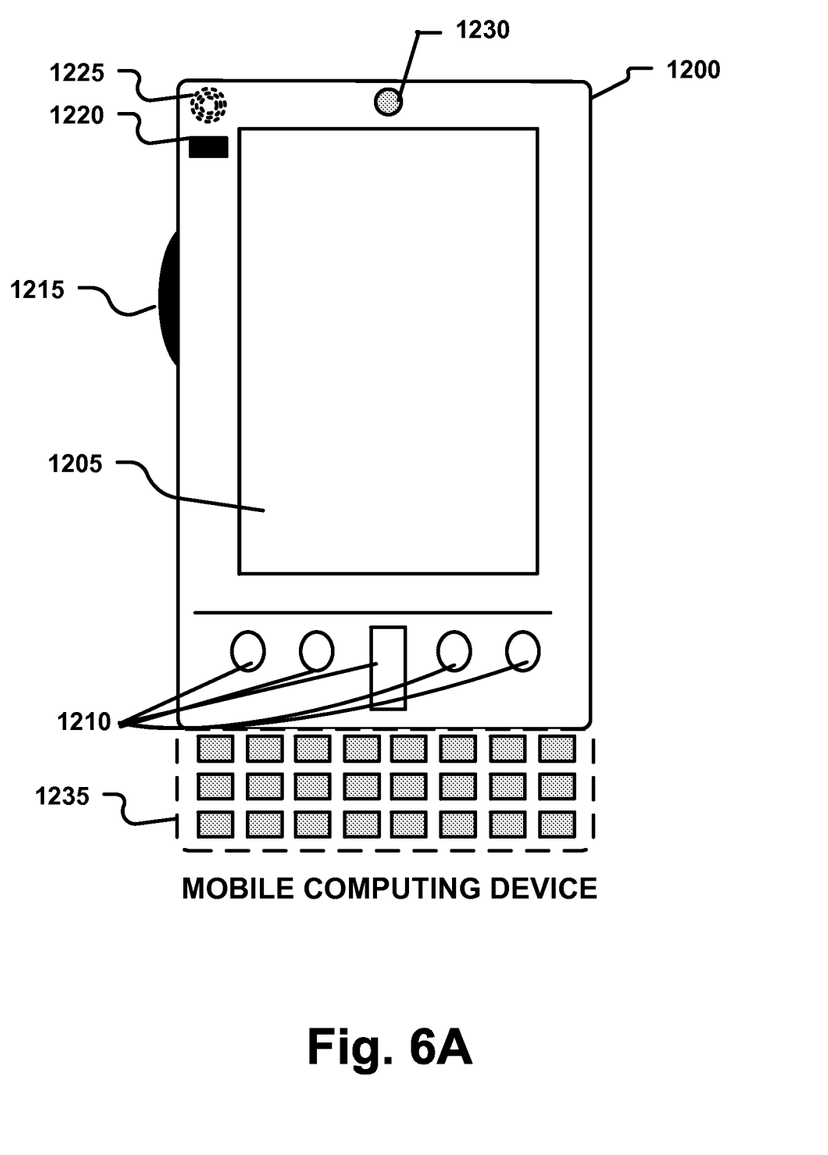
Figure 6B:
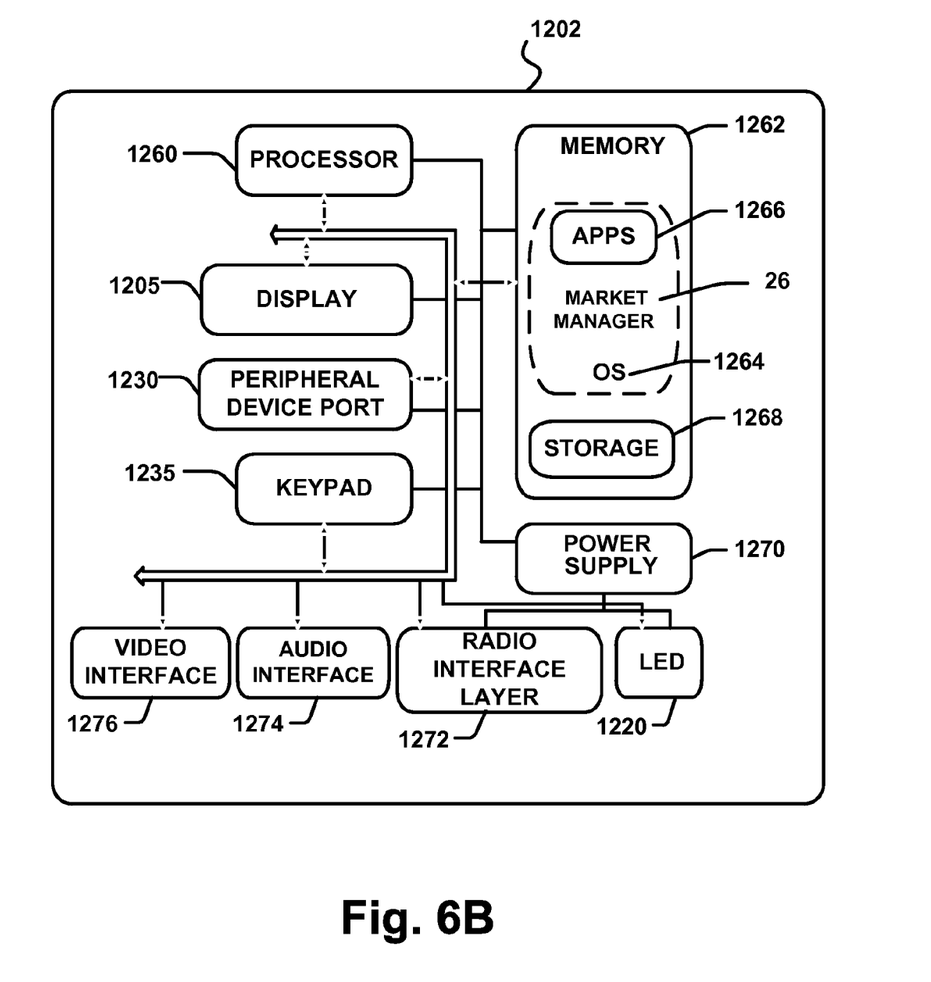
Figure 7:
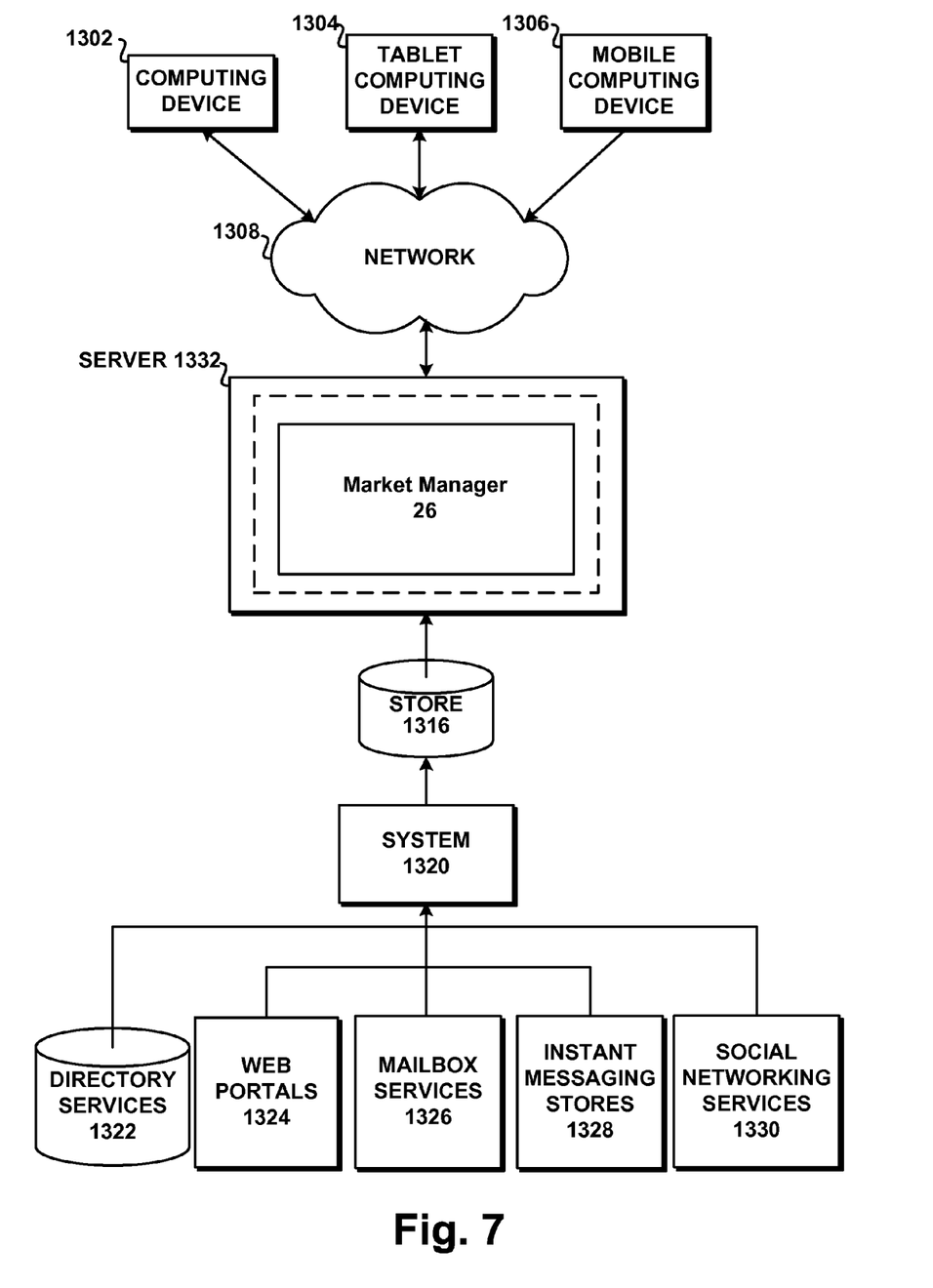

FIGS. 5-7 and the associated descriptions provide a discussion of a variety of operating environments in which embodiments of the invention may be practiced. However, the devices and systems illustrated and discussed with respect to FIGS. 5-7 are for purposes of example and illustration and are not limiting of a vast number of computing device configurations that may be utilized for practicing embodiments of the invention, described herein.

FIG. 5 is a block diagram illustrating example physical components of a computing device 1100 with which embodiments of the invention may be practiced. The computing device components described below may be suitable for the computing devices described above. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination. System memory 1104 may include operating system 1105, one or more programming modules 1106, and may include a web browser application 1120. Operating system 1105, for example, may be suitable for controlling computing device 1100's operation. In one embodiment, programming modules 1106 may include a market manager 26, as described above, installed on computing device 1100. Furthermore, embodiments of the invention may be practiced in conjunction with a graphics library, other operating systems, or any other application program and is not limited to any particular application or system. This basic configuration is illustrated in FIG. 5 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated by a removable storage 1109 and a non-removable storage 1110.

As stated above, a number of program modules and data files may be stored in system memory 1104, including operating system 1105. While executing on processing unit 1102, programming modules 1106, such as the manager may perform processes including, for example, operations related to methods as described above. The aforementioned process is an example, and processing unit 1102 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 26 may be operated via application-specific logic integrated with other components of the computing device/system 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, etc. Output device(s) 1114 such as a display, speakers, a printer, etc. may also be included. The aforementioned devices are examples and others may be used.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a suitable mobile computing environment, for example, a mobile telephone, a smartphone, a tablet personal computer, a laptop computer, and the like, with which embodiments of the invention may be practiced. With reference to FIG. 6A, an example mobile computing device 1200 for implementing the embodiments is illustrated. In a basic configuration, mobile computing device 1200 is a handheld computer having both input elements and output elements. Input elements may include touch screen display 1205 and input buttons 1210 that allow the user to enter information into mobile computing device 1200. Mobile computing device 1200 may also incorporate an optional side input element 1215 allowing further user input. Optional side input element 1215 may be a rotary switch, a button, or any other type of manual input element. In alternative embodiments, mobile computing device 1200 may incorporate more or less input elements. For example, display 1205 may not be a touch screen in some embodiments. In yet another alternative embodiment, the mobile computing device is a portable phone system, such as a cellular phone having display 1205 and input buttons 1210. Mobile computing device 1200 may also include an optional keypad 1235. Optional keypad 1235 may be a physical keypad or a "soft" keypad generated on the touch screen display.

Mobile computing device 1200 incorporates output elements, such as display 1205, which can display a graphical user interface (GUI). Other output elements include speaker 1225 and LED light 1220. Additionally, mobile computing device 1200 may incorporate a vibration module (not shown), which causes mobile computing device 1200 to vibrate to notify the user of an event. In yet another embodiment, mobile computing device 1200 may incorporate a headphone jack (not shown) for providing another means of providing output signals.

Although described herein in combination with mobile computing device 1200, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 6B is a block diagram illustrating components of a mobile computing device used in one embodiment, such as the computing device shown in FIG. 6A. That is, mobile computing device 1200 can incorporate system 1202 to implement some embodiments. For example, system 1202 can be used in implementing a "smart phone" that can run one or more applications similar to those of a desktop or notebook computer such as, for example, presentation applications, browser, e-mail, scheduling, instant messaging, and media player applications. In some embodiments, system 1202 is integrated as a computing device, such as an integrated personal digital assistant (PDA) and wireless phoneme.

One or more application programs 1266 may be loaded into memory 1262 and run on or in association with operating system 1264. Examples of application programs include phone dialer programs, e-mail programs, PIM (personal information management) programs, word processing programs, spreadsheet programs, Internet browser programs, messaging programs, and so forth. System 1202 also includes non-volatile storage 1268 within memory 1262. Non-volatile storage 1268 may be used to store persistent information that should not be lost if system 1202 is powered down. Application programs 1266 may use and store information in non-volatile storage 1268, such as e-mail or other messages used by an e-mail application, and the like. A synchronization application (not shown) may also reside on system 1202 and is programmed to interact with a corresponding synchronization application resident on a host computer to keep the information stored in non-volatile storage 1268 synchronized with corresponding information stored at the host computer. As should be appreciated, other applications may be loaded into memory 1262 and run on the device 1200, including the market manager 26, described above.

System 1202 has a power supply 1270, which may be implemented as one or more batteries. Power supply 1270 might further include an external power source, such as an AC adapter or a powered docking cradle that supplements or recharges the batteries.

System 1202 may also include a radio 1272 that performs the function of transmitting and receiving radio frequency communications. Radio 1272 facilitates wireless connectivity between system 1202 and the "outside world", via a communications carrier or service provider. Transmissions to and from radio 1272 are conducted under control of OS 1264. In other words, communications received by radio 1272 may be disseminated to application programs 1266 via OS 1264, and vice versa.

Radio 1272 allows system 1202 to communicate with other computing devices, such as over a network. Radio 1272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1202 is shown with two types of notification output devices; LED 1220 that can be used to provide visual notifications and an audio interface 1274 that can be used with speaker 1225 to provide audio notifications. These devices may be directly coupled to power supply 1270 so that when activated, they remain on for a duration dictated by the notification mechanism even though processor 1260 and other components might shut down for conserving battery power. LED 1220 may be programmed to remain on indefinitely until the user takes action to indicate the powered-on status of the device. Audio interface 1274 is used to provide audible signals to and receive audible signals from the user. For example, in addition to being coupled to speaker 1225, audio interface 1274 may also be coupled to a microphone to receive audible input, such as to facilitate a telephone conversation. In accordance with embodiments of the present invention, the microphone may also serve as an audio sensor to facilitate control of notifications, as will be described below. System 1202 may further include video interface 1276 that enables an operation of on-board camera 1230 to record still images, video stream, and the like.

A mobile computing device implementing system 1202 may have additional features or functionality. For example, the device may also include additional data storage devices (removable and/or non-removable) such as, magnetic disks, optical disks, or tape. Such additional storage is illustrated in FIG. 8B by storage 1268. Computer storage media may include volatile and nonvolatile, removable and non-removable media implemented in any method or technology for storage of information, such as computer readable instructions, data structures, program modules, or other data.

Data/information generated or captured by the device 1200 and stored via the system 1202 may be stored locally on the device 1200, as described above, or the data may be stored on any number of storage media that may be accessed by the device via the radio 1272 or via a wired connection between the device 1200 and a separate computing device associated with the device 1200, for example, a server computer in a distributed computing network such as the Internet. As should be appreciated such data/information may be accessed via the device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 7 illustrates a system architecture using TAP.

Components managed via the market manager 26 may be stored in different communication channels or other storage types. For example, components along with information from which they are developed may be stored using directory services 1322, web portals 1324, mailbox services 1326, instant messaging stores 1328 and social networking sites 1330. The systems/applications 26, 1320 may use any of these types of systems or the like for enabling management and storage of components in a store 1316. A server 1332 may provide communications and services relating to using and determining variations. Server 1332 may provide services and content over the web to clients through a network 1308. Examples of clients that may utilize server 1332 include computing device 1302, which may include any general purpose personal computer, a tablet computing device 1304 and/or mobile computing device 1306 which may include smart phones. Any of these devices may obtain display component management communications and content from the store 1316.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for price differentiation by market for In-App Purchases, comprising:
 receiving, at a computing device, an In-App Purchase (IAP) request from a processing device to purchase an item from an application store, wherein the request comprises location information for the processing device;
 determining a market associated with the processing device based on the location information;
 selecting, from a data storage connected with the computing device, a product identifier for the item from a plurality of product identifiers for the item based on the determined market and an identifier of the item from the request;
 extracting, from the data storage, the product identifier and purchase information associated with the product identifier; and
 transmitting to the processing device, the purchase information for the item that corresponds to the product identifier.

2. The method of claim 1, wherein determining the market associated with the user comprises determining a country that is associated with an account of the user in the application store.

3. The method of claim 1, wherein determining the product identifier for the item comprises, the application determining the product identifier from a mapping that includes product identifiers and corresponding markets.

4. The method of claim 1, wherein the application store comprises items used by iOS applications.

5. The method of claim 1, wherein the item is at least one of: a subscription, a consumable purchase and a nonconsumable purchase.

6. The method of claim 1, wherein the item is a same product that has different product IDs for each of the markets.

7. The method of claim 1, further comprising associating a different price with each of the different markets.

8. The method of claim 1, wherein determining the market associated with the user comprises receiving a location property from the application store in response to the IAP request that identifies a location of an account for the user for the application store.

9. The method of claim 1, wherein determining the market associated with the user comprises receiving a location property from the application store that identifies a country for the user.

10. A computer-readable storage media storing computer-executable instructions that, when executed by a computing device, cause the computing device to execute a method comprising:
  receiving, at a computing device, an In-App Purchase (IAP) request from an application on an iOS device to purchase an item from an application store, wherein the request comprises location information for the iOS device;
  determining a market associated with the iOS device based on the location information;
  selecting, from a data storage connected with the computing device, a product identifier for the item from a plurality of product identifiers for the item based on the determined market and an identifier of the item from the request;
  extracting, from the data storage, the product identifier and purchase information associated with the product identifier; and
  transmitting to the processing device, the purchase information for the item that corresponds to the product identifier.

11. The computer-readable storage media of claim 10, wherein determining the market associated with the user comprises determining a country that is associated with an account of the user in the application store.

12. The computer-readable storage media of claim 10, wherein determining the product identifier for the item comprises, the application determining the product identifier from using stored product identifiers.

13. The computer-readable storage media of claim 10, wherein the item is at least one of: a subscription, a consumable purchase and a nonconsumable purchase.

14. The computer-readable storage media of claim 10, wherein the item is a same product that has different product IDs for each of the markets.

15. The computer-readable storage media of claim 10, wherein determining the market associated with the user comprises receiving a location property from the application store in response to the IAP request that identifies a location of an account for the user for the application store.

16. A system for price differentiation by market for In-App Purchases, comprising:
  a processor and memory;
  an operating environment executing using the processor;
  a display; and
  a market manager that is configured to perform actions comprising:
    receiving an In-App Purchase (IAP) request from an application executing on a processing device to purchase an item from an application store, wherein the request comprises location information for the processing device;
    determining a market associated with the processing device based on the location information;
    selecting, from a data storage connected with the system, at least two product identifiers for the item based on the determined market and an identifier of the item;
    extracting, from the data storage, the at least two product identifiers and purchase information associated with the at least two product identifiers; and
    outputting to the processing device, the purchase information for the item that corresponds to the at least two product identifiers.

17. The system of claim 16, wherein determining the market associated with the user comprises determining a country that is associated with an account of the user in the application store.

18. The system of claim 16, wherein determining of the at least two product identifiers for the item further comprises, the application determining the product identifier from a listing of stored product identifiers for the item.

19. The system of claim 16, wherein the item is one of: a subscription, a consumable purchase and a nonconsumable purchase.

20. The system of claim 16, wherein determining the market associated with the user comprises receiving a location property from the application store in response to the IAP request that identifies a location of an account for the user for the application store.

* * * * *